(12) United States Patent
Buchwald et al.

(10) Patent No.: US 7,483,700 B2
(45) Date of Patent: *Jan. 27, 2009

(54) METHOD AND APPARATUS FOR DETERMINING APPROPRIATE CHANNELS FOR COMMUNICATION

(75) Inventors: Gregory J. Buchwald, Crystal Lake, IL (US); Steven F. Gillig, Roselle, IL (US); S. David Silk, Barrington, IL (US); Lawrence M. Ecklund, Wheaton, IL (US); Stephen L. Kuffner, Algonquin, IL (US)

(73) Assignee: Motorola, Inc., Schaumburg, IL (US)

( * ) Notice: Subject to any disclaimer, the term of this patent is extended or adjusted under 35 U.S.C. 154(b) by 115 days.

This patent is subject to a terminal disclaimer.

(21) Appl. No.: 11/536,240

(22) Filed: Sep. 28, 2006

(65) Prior Publication Data

US 2008/0039105 A1 Feb. 14, 2008

Related U.S. Application Data

(60) Provisional application No. 60/822,265, filed on Aug. 14, 2006.

(51) Int. Cl.
*H04Q 7/20* (2006.01)

(52) U.S. Cl. ............... 455/434; 455/450; 455/452.1; 455/409; 370/329; 370/338

(58) Field of Classification Search ........... 455/432.1, 455/432.3, 434, 435.2, 435.3, 426.1, 426.2, 455/436, 443, 444, 450, 452.1, 452.2, 509; 370/328, 329, 338

See application file for complete search history.

(56) References Cited

U.S. PATENT DOCUMENTS

| 4,573,206 | A | * | 2/1986 | Grauel et al. | 455/453 |
|---|---|---|---|---|---|
| 5,915,219 | A | * | 6/1999 | Poyhonen | 455/435.2 |
| 6,011,960 | A | * | 1/2000 | Yamada et al. | 455/77 |
| 2005/0094212 | A1 | * | 5/2005 | Asai et al. | 358/3.06 |
| 2005/0143082 | A1 | * | 6/2005 | Yang | 455/452.1 |
| 2006/0240777 | A1 | * | 10/2006 | Ruuska | 455/41.2 |
| 2007/0140102 | A1 | * | 6/2007 | Oh et al. | 370/208 |

OTHER PUBLICATIONS

Danijela Cabric, et al., "Implementation Issues In Spectrum Sensing For Cognitive Radios," 38th Annual Asilomar Conference on Signals, Systems and Computers, Nov. 2004, Wireless Research Center, University of California at Berkeley, USA.

* cited by examiner

*Primary Examiner*—Jean A Gelin

(57) ABSTRACT

During operation of a secondary communication system, cells (106) are formed by a plurality of localized nodes (104) to alert other nodes within the cell of frequencies which must be protected or otherwise avoided. All nodes within the cell monitor a differing subset of all frequencies available, and share information with respect to acceptable and protected frequencies with each other via low-power, short-range communication. Each node then forms a list of available channels for communication, and chooses a single node to report this information back to controller.

20 Claims, 2 Drawing Sheets

100

104

METHOD AND APPARATUS FOR DETERMINING APPROPRIATE CHANNELS FOR COMMUNICATION

RELATED APPLICATIONS

The present invention claims priority to U.S. Provisional Patent Application No. 60/822,265, filed Aug. 14, 2006.

FIELD OF THE INVENTION

The present invention relates generally to determining appropriate channels for communication and in particular, to a method and apparatus for determining appropriate channels for communication within a cognitive radio system.

BACKGROUND OF THE INVENTION

In a cognitive radio system of the type considered for use by IEEE 802.22, a cognitive secondary radio system will utilize spectrum assigned to a primary system using an opportunistic approach. With this approach, the secondary radio system will share the spectrum with primary incumbents as well as those operating under authorization on a secondary basis. Under these conditions, it is imperative that any user in the cognitive radio system not interfere with primary users.

A proposed technique for identifying available channels for use by the secondary communication system involves measuring the signal strength of various channels by nodes within the secondary radio system. This information is reported back to a network controller/coordinator. If the signal strength of any channel is above a predetermined signal level, the network controller prevents secondary devices from transmitting on that channel.

A weakness in the above technique is that all nodes are required to transmit channel information to the network controller/coordinator so that proper channel assignments may be made. This consumes a large amount of bandwidth. Thus, while cognitive radio holds the promise of adding additional spectrum for use by users such as public safety, etc., it also uses some of the newly-located spectrum to perform channel assignment. Therefore, a need exists for a method and apparatus for determining appropriate channels for communication within a cognitive radio system that reduces the amount of bandwidth required to make such a determination.

DETAILED DESCRIPTION OF THE DRAWINGS

In order to address the above-mentioned need, a method and apparatus for determining appropriate channels for communication is provided herein. During operation of a secondary communication system, cells are formed by a plurality of localized nodes to alert other nodes within the cell of frequencies which must be protected or otherwise avoided. All nodes within the cell monitor a differing subset of all frequencies available, and share information with respect to acceptable and protected frequencies with each other via low-power, short-range communication. Each node then forms a list of available channels for communication, and chooses a single node to report this information back to the controller.

The above channel-selection technique uses a single node among all nodes within the cell to feed back channel information to the controller. Because of this, the amount of feedback to the controller is greatly reduced. Thus, because all nodes do not transmit channel information to the network controller/coordinator, much less bandwidth is utilized when compared to prior-art channel selection techniques.

The present invention encompasses a method for determining available channels for communication within a communication system. The method comprises the steps of being assigned to a group of nodes, scanning a first group of channels at a first time for potential interference wherein the first group of channels differs from a second group of channels scanned by at least one other node within the group of nodes. A determination is made of good and/or bad channels from the first group of channels, and The good and/or bad channels is communicated to the group of nodes within the communication system, wherein the group of nodes is less than a total number of nodes within the communication system.

The present invention additionally encompasses a method comprising the steps of being assigned to cell comprising a plurality of nodes and scanning a first group of channels for potential interference wherein the first group of channels differs from a second group of channels scanned by at least one other node within the cell. A determination of good and/or bad channels is made from the first group of channels and this information is communicated to the plurality of nodes within the cell, wherein the plurality of nodes within the cell is less than a total number of nodes within the communication system.

The present invention additionally encompasses an apparatus assigned to a group of nodes. The apparatus comprises circuitry scanning a first group of channels for potential interference, wherein the first group of channels differs from a second group of channels scanned by at least one other node within the group of nodes. Logic circuitry is provided for determining good and/or bad channels from the first group of channels. Transmit circuitry is provided for communicating the good and/or bad channels to a plurality of nodes within the group of nodes.

Figure 1:
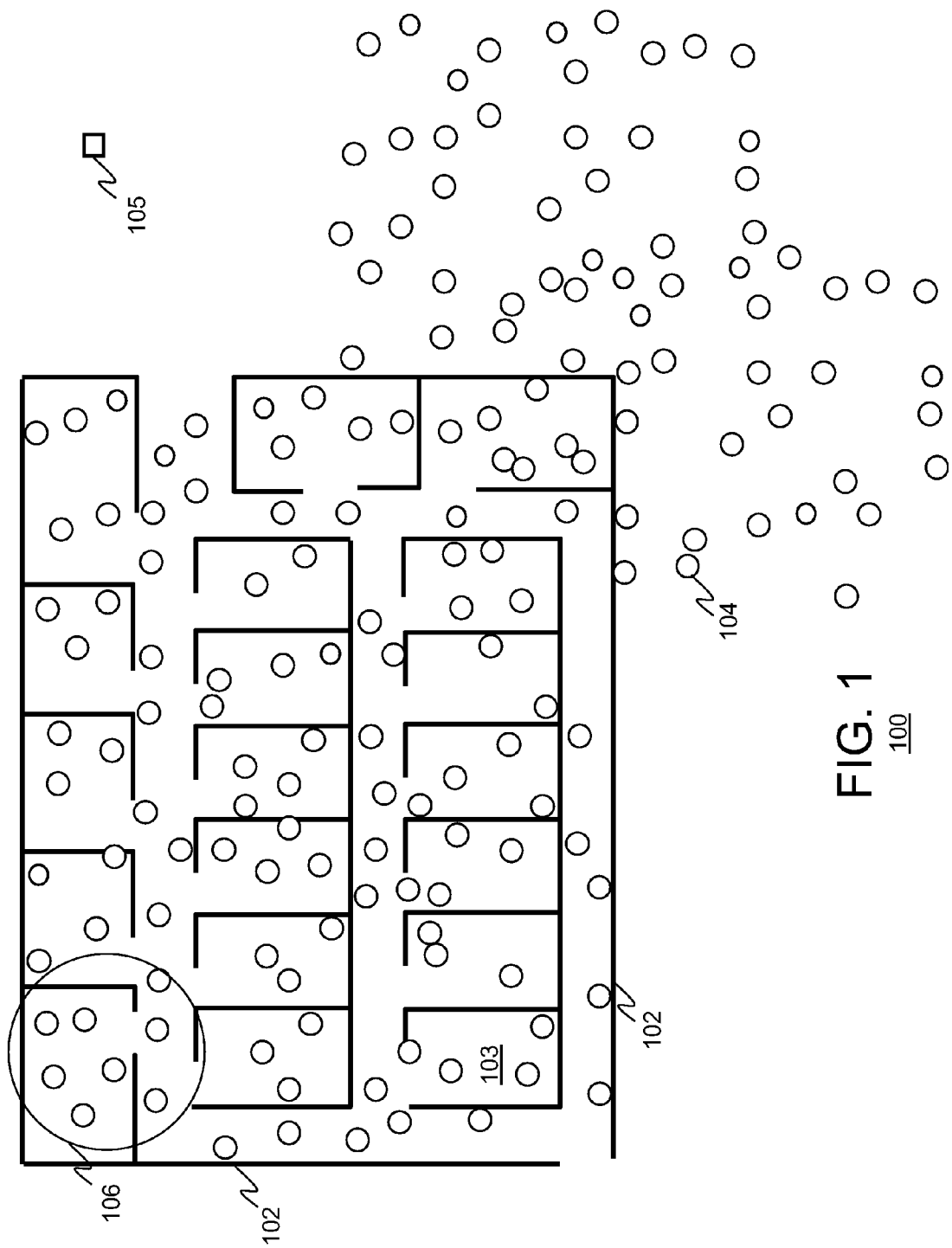
FIG. 1 is a block diagram of a communication system.

Turning now to the drawings, wherein like numerals designate like components, FIG. 1 is a block diagram of communication system 100 deployed inside and outside an interior of an office building. Communication system 100 is preferably a cognitive radio system that comprises a number of wireless devices 104-105 involved in determining a particular channel/frequency for transmission and reception. The office building comprises perimeter wall 102 that encloses a plurality of rooms 103 (only one labeled).

Circular objects, or nodes 104 (only one labeled) represent wireless devices that operate as part of a secondary communication system, and utilize spectrum assigned to a primary communication system using an opportunistic approach. With this approach, secondary nodes 104 will share the spectrum with primary nodes (not shown) as well as those operating under authorization on a secondary basis.

Rectangular object, or controller/coordinator 105 represents a wireless device that operates to assign channels within cognitive radio system 100. As part of channel assignment, controller 105 will receive a list of available channels from nodes 104, and will assign nodes 104 appropriate channels for communication. Thus, all nodes 104 within communication system 100 will receive channel assignments from controller 105.

It should be noted that although FIG. 1 shows nodes 104 existing within a two-dimensional space, one of ordinary skill in the art will recognize that nodes 104 may be located in other environments, including 3-dimensional spaces. For example, nodes 104 may comprise public safety first responder radio equipment located within a multi-level building, golf carts equipped with wireless transceivers located on a golf course, inventory tags located within a multi-level warehouse, . . . , etc.

Irrespective of the environment where nodes 104 operate, it is imperative that any node in cognitive radio system 100 not interfere with primary users. In order to avoid interfering with users of the primary communication system, nodes 104 will measure the signal strength of potential channels/frequencies. A list of good channels is passed back to controller 105. If the signal strength of any channel is above a predetermined signal level, nodes 104 will be prohibited from transmitting on that channel.

It should be noted that a channel used for communication may simply comprise a particular frequency used for transmission. However, in alternate embodiments of the present invention, a channel may also comprise a time period (timeslot) for transmission on a particular frequency. In further embodiments of the present invention, the particular channel may also comprise a channelization code, such as an orthogonal code utilized in a code-division, multiple-access communication system.

As discussed above, a weakness of above interference-avoidance technique is that a large amount of bandwidth is required for all nodes 104 to pass back channel information to controller 105. In order to address this issue, cells 106 (only one labeled) are formed by grouping a plurality of localized nodes 104. Nodes within the cell will alert other nodes 104 within cell 106 of frequencies which must be protected or otherwise avoided. All nodes within cell 106 preferably monitor a different subset of all available channels, and share information with respect to acceptable and protected channels with each other via low-power, short-range communication. (For redundancy some nodes may monitor a same subset of channels). In a first embodiment, a first group of channels monitored by a first node in the cell differs from a second group of channels scanned/monitored by at least one other node within the cell. Each node 104 then forms a list of available channels for communication, and chooses a single node 104 to report this information back to controller 105.

It should be noted that the available channels communicated to the controller is a much smaller subset than the total number of channels scanned by the plurality of nodes within cell 106 since it is assumed that the primary communication system will be utilizing many of the channels. Controller 105, then provides the plurality of nodes within cell 106 a list of available frequencies for use.

Because controller 105 receives channel information from many nodes 104 within many cells 106, certain nodes 104 (e.g., those nodes 104 outside the building) may report a frequency as being unusable, while other nodes 104 (e.g., those within the building) will report the same signal as being usable. For example, within the building an additional 15 dB or more attenuation of signals external to the building can be anticipated. Thus, nodes 104 within the building will typically receive signals at a lower signal level than nodes 104 outside the building. When a particular node 104 within a cell reports a channel as being a good candidate for transmissions, yet controller 105 does not include this channel within its list of good channels, the particular node 104 will realize that other nodes 104 (from other cells 106) must have found this channel as being a poor candidate for transmission. When this situation arises, the particular node 104, and all nodes 104 within its cell 106 may utilize the channel for short-range, low-power communication only. For example, this channel may be reserved for communication among nodes 104 within cell 106.

By the same token, nodes within cell 106 can also communicate and protect a particular frequency between its users. This can be accomplished by "falsely" reporting a good channel as being a poor candidate for communication. Thus, all nodes within communication system 100 will be prevented from performing long-range communication with the channel.

The above channel-selection technique uses a single node 104 among all nodes within cell 106 to feed back channel information to controller 105. Because of this, the amount of feedback to controller 105 is greatly reduced. Thus, because all nodes 104 do not transmit back channel information to network controller/coordinator 105, much less bandwidth is utilized when compared to prior-art channel selection techniques.

Figure 2:
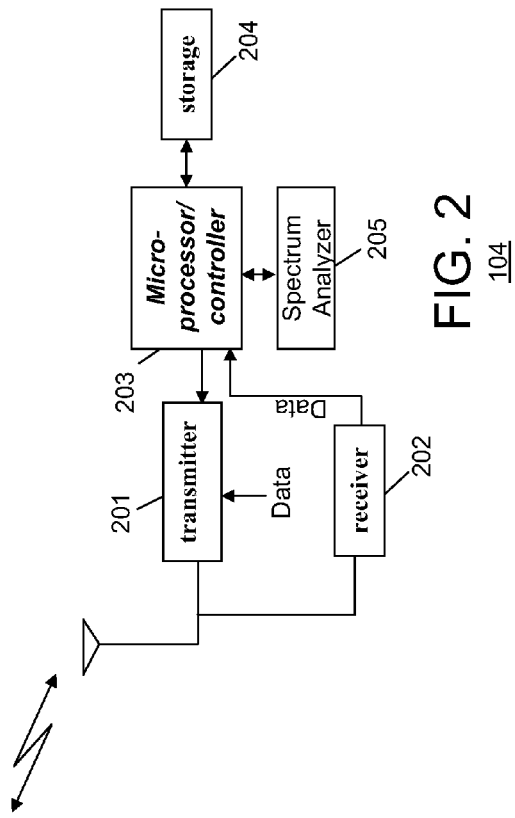
FIG. 2 is a block diagram of a node of FIG. 1.

FIG. 2 is a block diagram of node 104. As shown, node 104 comprises logic circuitry 203 (microprocessor 203), receive circuitry 202, and transmit circuitry 201, storage 204, and spectrum analyzer 205. Logic circuitry 203 preferably comprises a microprocessor controller, such as, but not limited to a Freescale PowerPC microprocessor. In the preferred embodiment of the present invention logic circuitry 203 serves as means for controlling node 104. Spectrum analyzer 205 serves as means for analyzing particular channels to determine if they are suitable for use. Additionally receive and transmit circuitry are common circuitry known in the art for communication utilizing a well known communication protocol, and serve as means for transmitting and receiving messages. For example, receiver 202 and transmitter 201 are well known transmitters that utilize the IEEE 802.22 communication system protocol. Other possible transmitters and receivers include, but are not limited to transceivers utilizing Bluetooth, IEEE 802.11, or HyperLAN protocols.

Figure 3:
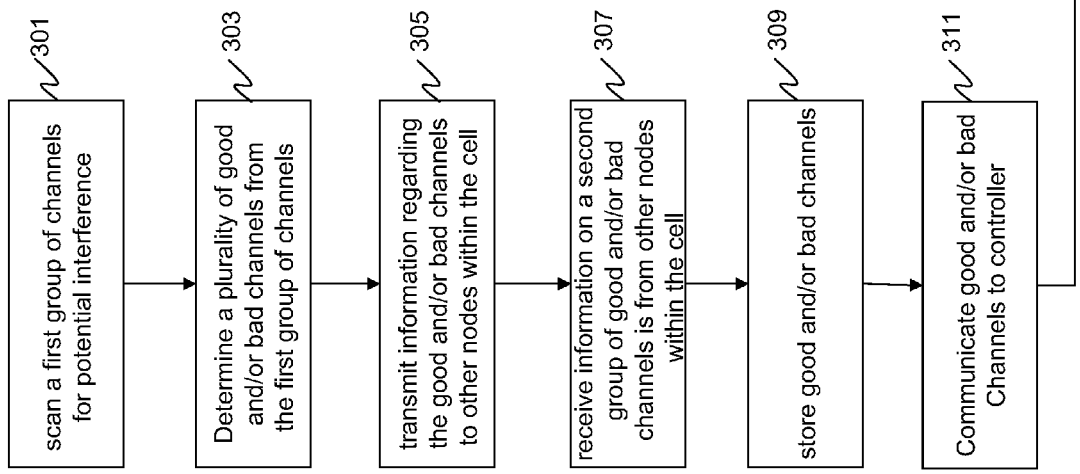
FIG. 3 is a flow chart showing operation of the node of FIG. 2.

FIG. 3 is a flow chart showing operation of the node of FIG. 2. It is assumed that the node has been assigned to a group of nodes, or cell. During operation, logic circuitry 203 instructs spectrum analyzer 205 to scan a first group of channels for potential interference (step 301). As discussed above, the first group of channels differs from a second group of channels scanned by at least one other node within the cell. The first group of channels comprises a first group of frequencies, a first group of frequency/timeslots, or a first group of channelization codes.

All nodes within the cell may be assigned differing channels to monitor/scan, however, some overlap may occur. Logic circuitry 203 then determines a plurality of good and/or bad channels from the first group of channels (step 303). At step 305 logic circuitry 203 instructs transmitter 201 to transmit information regarding the good and/or bad channels to other nodes within its cell via short-range, low-power communication. As discussed above, the plurality of nodes within the cell is less than a total number of nodes within the communication system.

Because nodes within the cell are monitoring and sharing channel information, at step 307 information about a second group of good and/or bad channels is received from other nodes 104 within the cell. In one embodiment of the present invention the second group of good and/or bad channels differs from the first group of good and/or bad channels. Information regarding all good and/or bad channels is then stored in storage 204 (step 309). At step 311, all good and/or bad channels are communicated to controller 105. This causes controller 105 to communicate the good and/or bad channels to other nodes within the network (preferably all nodes within the network). Thus, receiver 202 will receive a list of good and/or bad channels from controller 105 (step 313). The list will comprise information on available channels as perceived by all nodes within the communication system. As discussed above, logic circuitry 203 can access storage 204 to determine if a channel available for communication has not been identified as such by the controller 105. If this is the case, the channel may be used for local communication only (e.g., communications within the cell).

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method for determining available channels for communication within a communication system, the method comprising the steps of:
    a node being assigned to a group of nodes;
    scanning by the node, a first group of channels at a first time for transmissions wherein the first group of channels differs from a second group of channels scanned by at least one other node within the group of nodes;
    determining, by the node, good and/or bad channels from the first group of channels, wherein the good channels comprise channels having no transmissions, and the bad channels comprise channels having transmissions;
    communicating by the node, the good and/or bad channels to the group of nodes within the communication system, wherein the group of nodes is less than a total number of nodes within the communication system.

2. The method of claim 1 further comprising communicating good and/or bad channels to a controller, causing the controller to communicate the good and/or bad channels to other nodes within the communication system, wherein the other nodes are not part of the group of nodes.

3. The method of claim 1 wherein the first group of channels comprises a first group of frequencies, a first group of frequency/timeslots, or a first group of channelization codes.

4. The method of claim 1 further comprising the step of:
    receiving information about a second group of good and/or bad channels from other nodes within the group of nodes.

5. The method of claim 1 further comprising the step of:
    receiving a list of good and/or bad channels from the controller.

6. The method of claim 5 further comprising the steps of:
    determining that a channel available for communication has not been identified as such by the controller; and
    using the channel for local communication only.

7. A method within a communication system comprising the steps of:
    being assigned to a cell comprising a plurality of nodes;
    scanning a first group of channels for transmissions wherein the first group of channels differs from a second group of channels scanned by at least one other node within the cell; and
    determining a good and/or bad channels from the first group of channels, wherein the good channels comprise channels having no transmissions, and the bad channels comprise channels having transmissions;
    communicating the good and/or bad channels to the plurality of nodes within the cell, wherein the plurality of nodes within the cell is less than a total number of nodes within the communication system.

8. The method of claim 7 further comprising the step of:
    communicating good and/or bad channels to a controller, causing the controller to communicate the good and/or bad channels to other nodes within the communication system, wherein the other nodes are not part of the cell.

9. The method of claim 7 wherein the first group of channels comprises a first group of frequencies, a first group of frequency/timeslots, or a first group of channelization codes.

10. The method of claim 7 further comprising the step of:
    receiving information about a second group of good and/or bad channels from other nodes within the cell.

11. The method of claim 10 wherein the first group of good and/or bad channels differs from the second group of good and/or bad channels.

12. The method of claim 8 further comprising the step of:
    receiving a list of good and/or bad channels from the controller.

13. The method of claim 12 further comprising the steps of:
    determining that a channel available for communication has not been identified as such by the controller; and
    using the channel for local communication only.

14. An apparatus assigned to a group of nodes, the apparatus comprising:
    circuitry scanning a first group of channels for transmissions, wherein the first group of channels differs from a second group of channels scanned by at least one other node within the group of nodes;
    logic circuitry determining good and/or bad channels from the first group of channels, wherein the good channels comprise channels having no transmissions, and the bad channels comprise channels having transmissions; and
    transmit circuitry communicating the good and/or bad channels to a plurality of nodes within the group of nodes.

15. The apparatus of claim 14 wherein the transmission circuitry additionally communicates good and/or bad channels to a controller, causing the controller to communicate the good and/or bad channels to other nodes within the communication system, wherein the other nodes are not part of the group of nodes and the plurality of nodes is less than a total number of nodes within the communication system.

16. The apparatus of claim 14 further comprising:
    receive circuitry receiving information about a second group of good and/or bad channels from other nodes within the group of nodes.

17. The apparatus of claim 16 wherein the first group of good and/or bad channels differs from the second group of good and/or bad channels.

18. The apparatus of claim 14 further comprising:
    receive circuitry receiving a list of good and/or bad channels from the controller.

19. The apparatus of claim 18 wherein the logic circuitry additionally determines that a channel available for communication has not been identified as such by the controller and utilizes the channel for local communication only.

20. The apparatus of claim 14 wherein the first group of channels comprises a first group of frequencies, a first group of frequency/timeslots, or a first group of channelization codes.

* * * * *